United States Patent
Bonne et al.

(10) Patent No.: US 10,526,938 B2
(45) Date of Patent: Jan. 7, 2020

(54) ARRANGEMENT AND METHOD FOR CONTROLLING A FLOW OF CRANKCASE GASES FROM AN INTERNAL COMBUSTION ENGINE PRIOR TO OIL SEPARATION

(71) Applicant: SOGEFI FILTRATION, Guyancourt (FR)

(72) Inventors: Samuel Bonne, La Graverie (FR); Christophe Petipas, Le Chesnay (FR); Dominique Oursin, Le Plessis Robinson (FR)

(73) Assignee: SOGEFI FILTRATION FRANCE, Guyancourt (FR)

( * ) Notice: Subject to any disclaimer, the term of this patent is extended or adjusted under 35 U.S.C. 154(b) by 15 days.

(21) Appl. No.: 15/759,839

(22) PCT Filed: Sep. 13, 2016

(86) PCT No.: PCT/FR2016/052306
§ 371 (c)(1),
(2) Date: Mar. 14, 2018

(87) PCT Pub. No.: WO2017/046509
PCT Pub. Date: Mar. 23, 2017

(65) Prior Publication Data
US 2018/0252129 A1    Sep. 6, 2018

(30) Foreign Application Priority Data

Sep. 14, 2015    (FR) ...................................... 15 58533

(51) Int. Cl.
*F01M 13/00*    (2006.01)
*G05D 7/03*    (2006.01)
*F01M 13/04*    (2006.01)

(52) U.S. Cl.
CPC ........... *F01M 13/0011* (2013.01); *G05D 7/03* (2013.01); *F01M 13/04* (2013.01); *F01M 2013/0005* (2013.01); *F01M 2013/0044* (2013.01)

(58) Field of Classification Search
CPC .... F01M 13/0011; F01M 13/00; F01M 13/04; F01M 2013/0005; F01M 2013/0038; F01M 2013/0044; F01M 2013/027; G05D 7/03
(Continued)

(56) References Cited

U.S. PATENT DOCUMENTS 4,028,243 A * 6/1977 Offer .................... B01D 27/103
                                                           210/130
5,137,050 A * 8/1992 Clarke .................... F16K 1/465
                                                           137/541
(Continued)

FOREIGN PATENT DOCUMENTS

DE    10 2005 043735    3/2007
DE    10 2009 008831    8/2010
(Continued)

OTHER PUBLICATIONS

International Search Report, PCT/FR2016/052306, dated Dec. 1, 2016.

*Primary Examiner* — Joseph J Dallo
*Assistant Examiner* — Yi-Kai Wang
(74) *Attorney, Agent, or Firm* — Young & Thompson

(57) ABSTRACT

The arrangement for controlling the flow of laden gases is arranged upstream of an oil separation system and is provided with a check valve, a bypass valve and a stationary segment. The check valve is at least partially movable so as to define a first passage for a forward first flow direction in the event of positive pressure, while the bypass valve is moved rearward by negative pressure so as to clear a second (Continued)

passage for a second, opposite, flow direction. The stationary segment forms a seating surface for the bypass valve. The bypass valve, urged against the seating surface by an elastic biasing member, forms a seat for the check valve. In the event of sufficient negative pressure, the two valves are moved rearward together despite the biasing member and work together to redirect and guide the flow along an escape path corresponding to the second passage.

21 Claims, 6 Drawing Sheets

(58) Field of Classification Search
USPC ..................................................... 123/41.86
See application file for complete search history.

(56) References Cited

U.S. PATENT DOCUMENTS

| 5,228,424 | A | * | 7/1993 | Collins | ............... | F01M 13/023 |
| | | | | | | 123/574 |
| 2010/0077972 | A1 | | 4/2010 | Doers | | |
| 2015/0345349 | A1 | * | 12/2015 | Monros | ............. | F01M 13/0011 |
| | | | | | | 123/574 |

FOREIGN PATENT DOCUMENTS

| DE | 10 2009 009799 | 9/2010 |
| DE | 10 2011 004719 | 8/2012 |
| JP | S59 126014 | 7/1984 |

\* cited by examiner

US 10,526,938 B2

ARRANGEMENT AND METHOD FOR CONTROLLING A FLOW OF CRANKCASE GASES FROM AN INTERNAL COMBUSTION ENGINE PRIOR TO OIL SEPARATION

FIELD OF INVENTION

The present invention relates to devices for controlling the flow of gases laden with elements in suspension in an internal combustion engine, these gases circulating in a circuit for recirculating crankcase gases which has an oil purification system.

The scope of the invention particularly concerns the control of crankcase gases in internal combustion engines for road vehicles (for example cars, trucks, motorcycles) or ships and in industrial combustion engines (engine-generators for example).

BACKGROUND OF INVENTION

The flow of crankcase gases must be controlled, in particular in gasoline turbocharged engines, when it is desired to guide such gases either towards the manifold (for example at low engine load, knowing that there is sufficient negative pressure in the manifold) or towards upstream of the turbocharger, depending on the operative phase of the engine. The management of these flows of clean air and exhaust ("blowby" gases) is driven by the need to always have negative pressure in the crankcase.

More generally, it is understood that it may be necessary to be able to selectively direct the crankcase gases according to the engine load:
either into a first area of the air intake circuit,
or into a second area of the air intake circuit, distinct from the first area.

It is known to use several valves to do so. In gasoline turbocharged engines in particular, a check valve is used which, in the open state, directs the blowby gases into the area upstream of the turbocharger. In case of insufficient load, the check valve is closed and another valve providing access to the manifold is typically opened (this is a negative pressure circulation mode). At high load, the pressure in the manifold is positive, such that this valve providing access to the manifold is closed, while the check valve opens. The goal is to always have a negative pressure so that the crankcase exerts suction.

On the other hand, a calibrated valve may sometimes be added to limit the suction. It acts to regulate the pressure. For this valve to work properly (under low pressures), it must have a large surface area.

A crowding issue exists in the above systems for controlling the flow of crankcase gases. Indeed, the environment under the cylinder head cover is generally crowded, one or more oil separation devices being placed at this location (devices which may be part of the air intake recirculation circuit). There is therefore a need to integrate effective ways to control the flow of crankcase gases in a highly compact manner.

OBJECTS OF THE INVENTION

The invention aims to overcome one or more of the above disadvantages by providing a valve arrangement for controlling a flow of crankcase gases which is simple in design and simple to integrate, while providing a good compromise between compactness and separation efficiency.

To this end, the invention relates to an arrangement for controlling a flow of laden gases issuing from a crankcase of an internal combustion engine, intended to be placed between an upstream inlet area supplying the laden gases and a downstream area in communication with an air intake recirculation system of the engine, comprising:
  a check valve having a closing member opening under the effect of positive pressure so as to define a first passage for a first flow direction (i.e., in a first configuration when the gas pressure in the upstream area is greater than the gas pressure in the downstream area);
  a bypass valve set in motion by negative pressure and enabling the defining of a second passage for a second flow direction that is opposite the first flow direction (in a second configuration when the gas pressure in the downstream area is greater than the gas pressure in the upstream area);
  a pipe segment having a stationary seating surface adapted to define, with the bypass valve, the second passage;
  an elastic biasing member engaged with one among the check valve and bypass valve;
knowing that the bypass valve defines a seat on which the closing member of the check valve comes to rest in a closed configuration of the first passage, the elastic biasing member exerting a restoring force directed in a first direction referred to as the forward direction, which urges the bypass valve towards a position which closes the second passage,
with the particular feature that the closing member of the check valve and the bypass valve are adapted to retreat in a second direction called the rearward direction which is opposite to the first direction, under the effect of negative pressure.

With these arrangements, the functions conventionally performed by two valves are combined by using an elastic biasing member, preferably only one, which, under the effect of the negative pressure, moves the bypass valve rearward to clear the second passage (of course, the terms forward and rearward are used in the present description in a uniform manner, the front always being on the side opposite the inlet).

Having two movable valves placed at the same location provides more compactness, with no need for excessive reduction of the cross-sectional area of the valves. The cross-sectional area of the bypass valve can be significant and the bypass valve can typically be formed of a closing member that is more rigid than the closing member of the check valve. This avoids using too small of a valve cross-section, which can typically create problems associated with too low of a stiffness of the spring (or equivalent means forming the biasing member), knowing that the bypass valve must be moved to clear the second passage when slight negative pressures appear, for example of around 40 mbar according to some requirements of automobile manufacturers.

According to one feature, the elastic biasing member extends between a first end and a second end which are aligned along an axis of movement common to the check valve and bypass valve, the first end being slidingly integral with the bypass valve, the second end being in contact with a stationary stop surface. With this type of arrangement, the check valve can be better guided, for example by means of an axial rod on which the bypass valve is directly and integrally mounted. It is understood that the check valve and the bypass valve are then each slidable and guided by means of at least one common rod, which preferably is part of the bypass valve. The check valve is particularly stable in this case (despite an environment having many vibrations), and this thus improves the sealing of the first passage.

According to another feature, the closing member of the check valve, preferably having no opening, has a predefined face which comes into annular contact with the seat in order to obtain the closed configuration of the first passage, this predefined face being oriented in the second direction, in opposition to the restoring force. The annular contact is thus an axial (non-radial) contact, which reduces friction against the bypass valve.

In various embodiments of the arrangement provided for controlling a flow of laden gases, it is possible according to the invention to also make use of at least one of the following arrangements:

- the bypass valve comprises at least one passage orifice facing the closing member, the check valve being forwardly unbiased or less biased by the elastic biasing member than the bypass valve, such that the bypass valve moves rearward to clear the second passage only in a closed configuration of the first passage in which the closing member seals said passage orifice (the biasing member thus allows integral movement of the movable assembly formed by the two valves in order to obtain the second configuration).
- the rod has a portion which slides in a predefined fixed guide provided with a stop surface which allows defining the position of a fixed end of the elastic biasing member, the elastic biasing member preferably being a coil spring.
- the portion moving along the fixed guide is preferably an intermediate portion away from the ends of the rod.
- the arrangement comprises a predefined fixed guide for the sliding of a first end of the rod, for example the front side.
- the arrangement comprises an additional fixed guide for guiding a second end of the rod, for example the rear side.
- the pipe segment, formed as a single plastic part, defines a mounting bracket for the bypass valve and comprises an axial sleeve which defines the predefined fixed guide.
- the axial sleeve has an end proximal to the check valve, and the check valve, which preferably comprises elastomeric material, is mounted so as to slide on the rod between this proximal end, preferably closed, of the axial sleeve and a perforated portion of the bypass valve.
- the pipe segment also comprises an annular outer portion integral with the axial sleeve, comprising an outer peripheral face typically adapted for attachment by fluidtight radial contact in a rigid pipe of the circuit for laden gases.
- the annular outer portion of the pipe segment defines, by an annular axial face, the stationary seating surface, at least one passage opening being bounded by the segment in a plane common with the stationary seating surface, knowing that the segment has at least one longitudinal passage formed between the axial sleeve and the annular outer portion, and open at the passage opening side in an open configuration of the first passage and second passage, respectively.
- said longitudinal passage of the segment may consist of a plurality of longitudinal channels which lead to the same passage end of larger cross-section which corresponds to the area of movement of the check valve.
- the bypass valve comprises a perforated portion that is centrally connected to the rod, said seat in a peripheral annular area of the perforated portion, and a skirt, preferably of generally cylindrical shape.
- the skirt externally supports a O-ring seal adapted to come to bear against the stationary seating surface.
- the bypass valve comprises guide tabs, each extending in the first direction from an annular area in contact with the O-ring, and each adapted to fit against an inner annular face of the pipe segment and define an end position of the backward travel of the bypass valve.
- the elastic biasing member is a spring, mounted so as to be energized by compression when the second passage is clear.
- the bypass valve has a perforated portion which defines an inlet face for the laden gases flowing through the first passage (inlet face of the arrangement), the spring extending substantially from the inlet face side.
- alternatively, the spring extends substantially from the side opposite the inlet face of the arrangement.
- the pipe segment is made integral with a duct bounded at the top by a cylinder head cover of an internal combustion engine.

Also provided is a method for controlling a flow of crankcase gases using the arrangement according to the invention, to enable simple and effective operation in a crowded environment, for example under a cylinder head cover of an engine.

For this purpose, the method for controlling a flow of laden gases issuing from a crankcase of a combustion engine comprises the steps consisting essentially of:

- routing a flow of laden gases between an inlet and an air intake recirculation system of the engine (system in which purification of the laden gases is typically performed), passing through the pipe segment of the arrangement according the invention,
- allowing the flow of laden gases to travel in a first flow direction through the segment, during normal operation with positive pressure, via the first passage defined between the check valve of the arrangement (check valve which is in a forward position) and the bypass valve held in its contact position against the stationary seating surface defined by the segment,
- closing the first passage by moving the check valve rearward until it comes in contact with the bypass valve, when the pressure becomes negative, and allowing the bypass valve to move away from the stationary seating surface when a negative pressure threshold is reached in order to clear the second passage between the bypass valve and the stationary seating surface and thereby obtain a second flow direction through the segment, opposite to the first flow direction, said negative pressure threshold preferably being between 30 and 50 mbar.

BRIEF DESCRIPTION OF DRAWINGS

Other features and advantages of the invention will be apparent from the following description of several embodiments given as non-limiting examples, with reference to the accompanying drawings in which:

FIGS. 2A-2B and 3 are similar sectional views of the arrangement of FIG. 1, where FIGS. 2A-2B respectively show an open state under the effect of positive pressure and a closed state of the check valve to illustrate its mobility, while FIG. 3 illustrates the movement of the movable assembly formed by the two valves beyond a negative pressure threshold in order to open the bypass valve (bypass mode);

FIGS. 5A and 5B illustrate an arrangement according to a second embodiment of the invention, FIG. 5A being a front view showing the inlet face of the arrangement, while FIG. 5B is a longitudinal sectional view;

DESCRIPTION OF PREFERRED EMBODIMENTS OF THE INVENTION

In the various figures, identical references indicate identical or similar elements.

Figure 1:
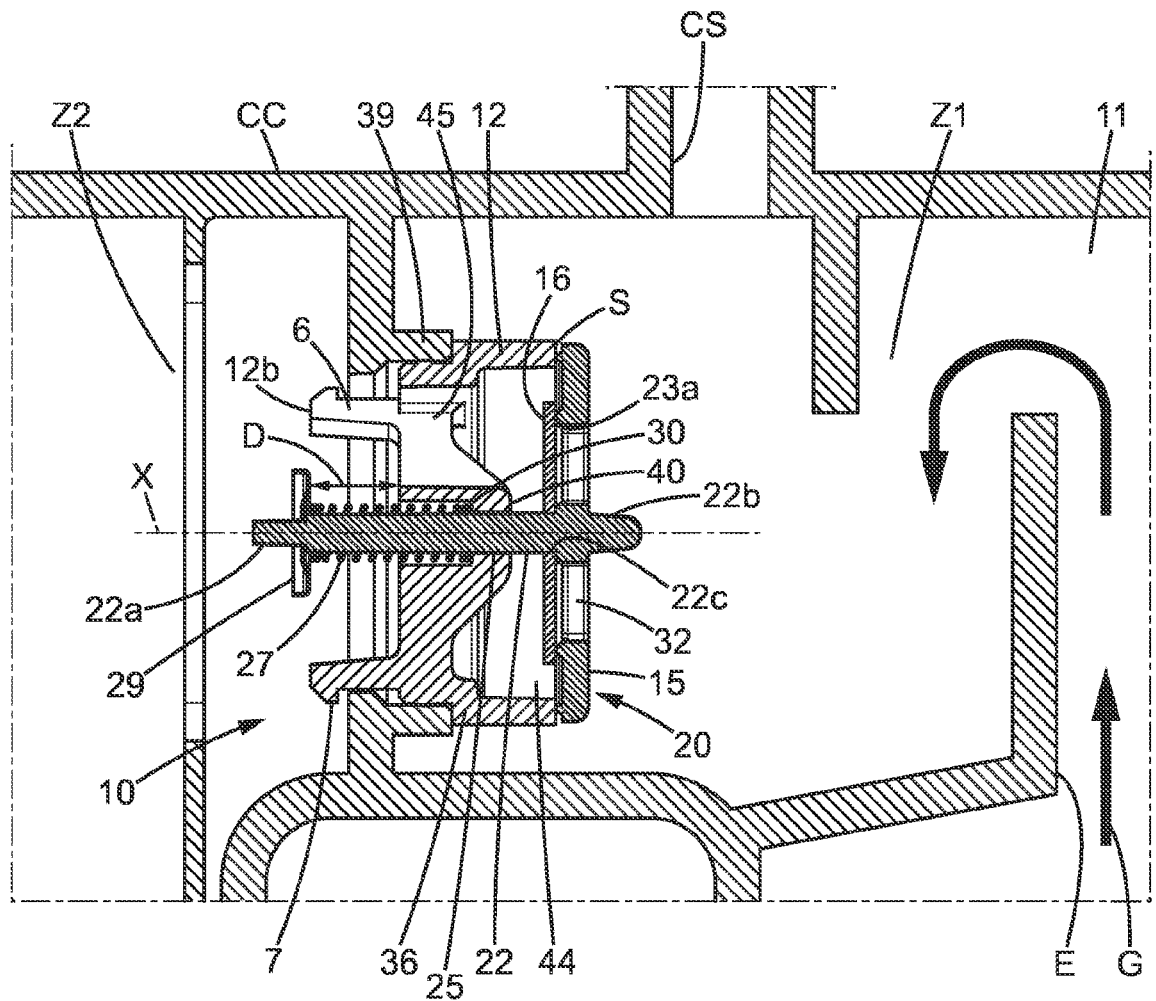
FIG. 1 is a vertical sectional view of the arrangement according to a first embodiment of the invention, in an example mounted under a cylinder head cover.
Figure 4:
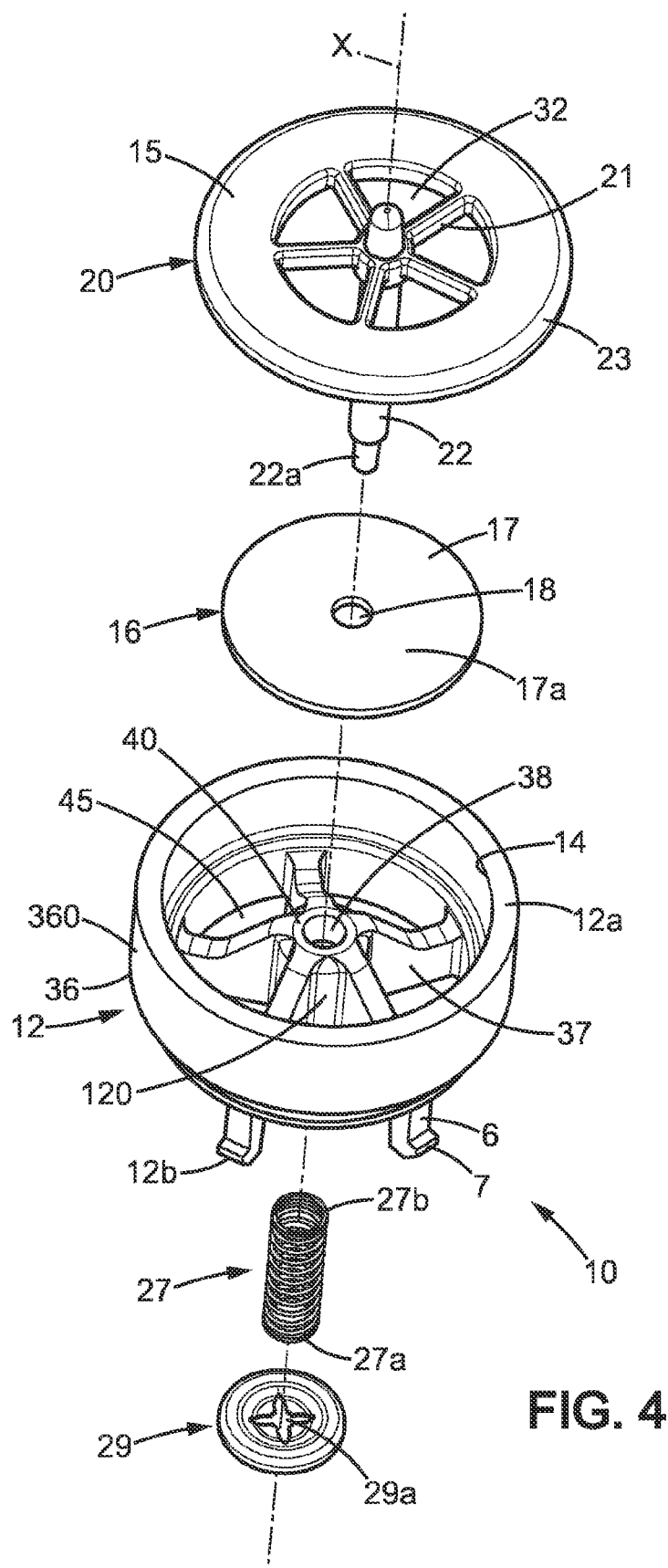
FIG. 4 is an exploded view of the arrangement of FIG. 1.

Referring to FIGS. 1 and 4, the arrangement 10 for controlling the flow of laden gases G is provided for adapting to the pressure conditions of a system which separates liquids (and possibly solids) from the crankcase gases issuing from an internal combustion engine. As is clearly visible in FIG. 1, the laden gases G directly issuing from the crankcase are guided from an inlet 11 to the separator system (not shown and of a type that is known per se, allowing for example the separation of oil by filtration, impaction, or other known separation technique) which purifies the laden gases G. It is only after one or more steps of oil separation that the gases reach a connecting pipe leading back to the air intake. The arrangement 10 comprises a pipe segment 12 which extends around a longitudinal axis X. This pipe segment 12 may be formed as one part or may be assembled.

The axial end 12a, at the inlet 11 side, defines a wide opening 14 visible in FIG. 4. The opening 14 can be completely closed by a movable assembly having two valves 16 and 20, of which the outer face 15 (see also FIG. 5A) may have a slightly larger size than that of the opening 14. The check valve 16 forms a first valve located in back of the radial portion of a bypass valve 20 which forms the second valve. The bypass valve 20 here comprises a central perforated portion 21, which is for example in the form of a star having a plurality of arms (five arms in the non-limiting example of FIG. 4), a guide rod 22 integrally connected to the central portion 21, and a peripheral portion 23. The axial end 12a forms an annular axial face which defines the stationary seating surface S, on which rests the peripheral portion 23. The axial end 12a here is formed in an annular outer portion 36 of the pipe segment 12. The stationary seating surface S effectively in contact with the peripheral portion 23 may be a continuous annular surface narrower than the annular axial face of the axial end 12a.

The bypass valve 20 here is formed as one part of a preferably rigid material, while the check valve 16 may be entirely flexible or may have a flexible closing member 17, for example of elastomer or rubber. In this case, the material has shape memory to prevent the valve 16 from assuming an incorrect shape.

The central portion 21 and peripheral portion 23 form the radial portion of the bypass valve. The peripheral portion 23 has, on one side (referred to herein as the back of the radial portion), a continuous annular surface, preferably adjacent to the perforated central portion, which defines a seat for the check valve 16. It can be seen that the rod 22 serves here as a support for the check valve. A free end 22a of reduced cross-section of the rod enables easy insertion of the rod 22 through the check valve 16. The other end 22b of the rod 22 may form a projection relative to the outer face 15. The check valve 16 may have a disc shape and has a central orifice 18 for the passage of the rod 22.

Referring to FIG. 1, in the mounted state of the two-valve assembly, the rod 22 passes linearly through a fixed guide 25 defined in an axial sleeve 120 of the pipe segment 12 and is used to orient an elastic biasing member 27, for example a spring, so that the restoring force is exerted in the axial direction defined by the longitudinal axis X. Here, this restoring force is exerted frontward (the side opposite to the inlet 11).

Here, the elastic biasing member 27 has a first end 27a, distal from the opening 14, which moves integrally with the bypass valve 20 by being mounted against a retaining member 29 fixed in translation relative to the valve 20. This retaining member 29 is for example part of the bypass valve 20 or may be attached thereto. A washer may optionally form such a retaining member 29, with the end 22a of the rod 22 which passes through the orifice 29a of the retaining member 29 and enables force-fitting. When portion 23 is in contact with the seating surface S, the retaining member 29 is typically situated at a significant distance D from the axial sleeve 120 and therefore does not prevent the rod 22 from freely moving rearward. This distance D is for example greater than or equal to half or one third of the length of the spring that defines the elastic biasing member 27.

The second end 27b, facing and proximal to the opening 14, is non-slidingly held by a stationary stop surface 30. The axial sleeve 120 has for example an inner shoulder or at least a similar contour to define such a stop surface 30.

It is understood that the longitudinal axis X forms a common axis of movement for the check valve 16 and the bypass valve 20. This configuration with a single biasing member 27 inserted in a fixed guide 25 that is part of the pipe segment 12 allows placing the biasing member 27 at the center of the arrangement 10 and on the same side relative to the check valve 16. This also minimizes the length of the arrangement 10 along the longitudinal axis X.

Figure 2A:
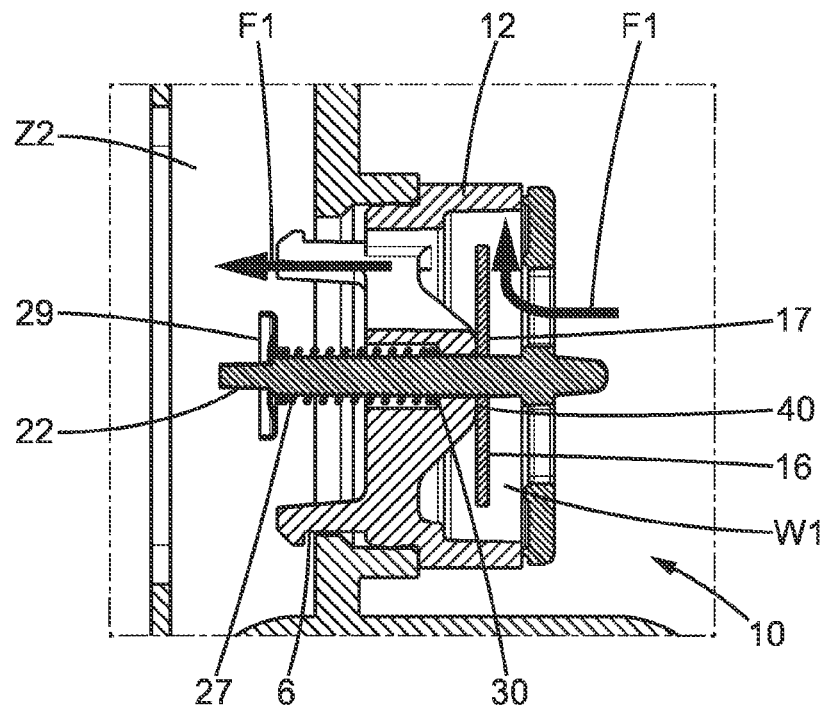
Figure 2B:
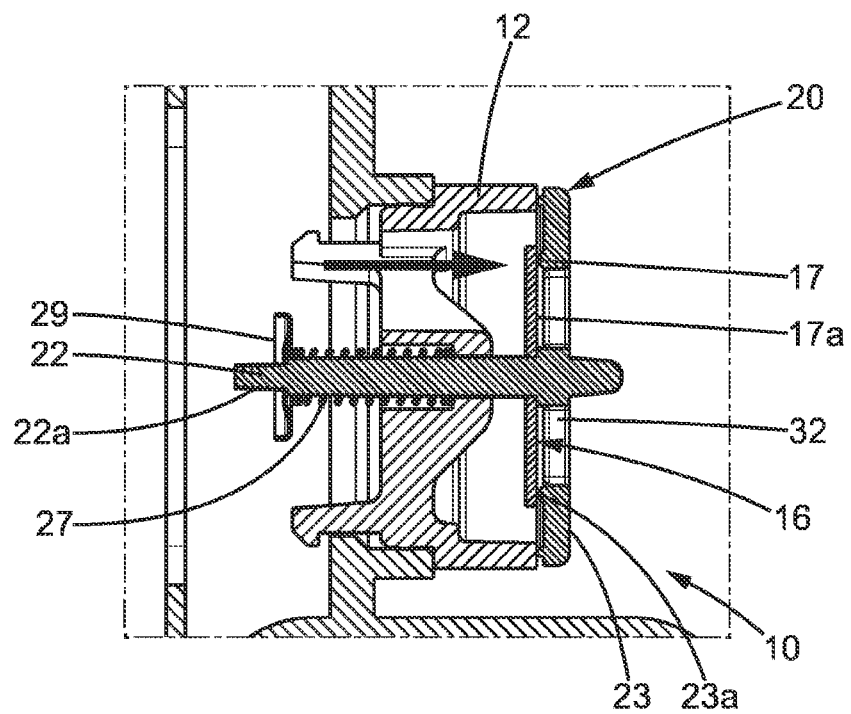
Figure 3:
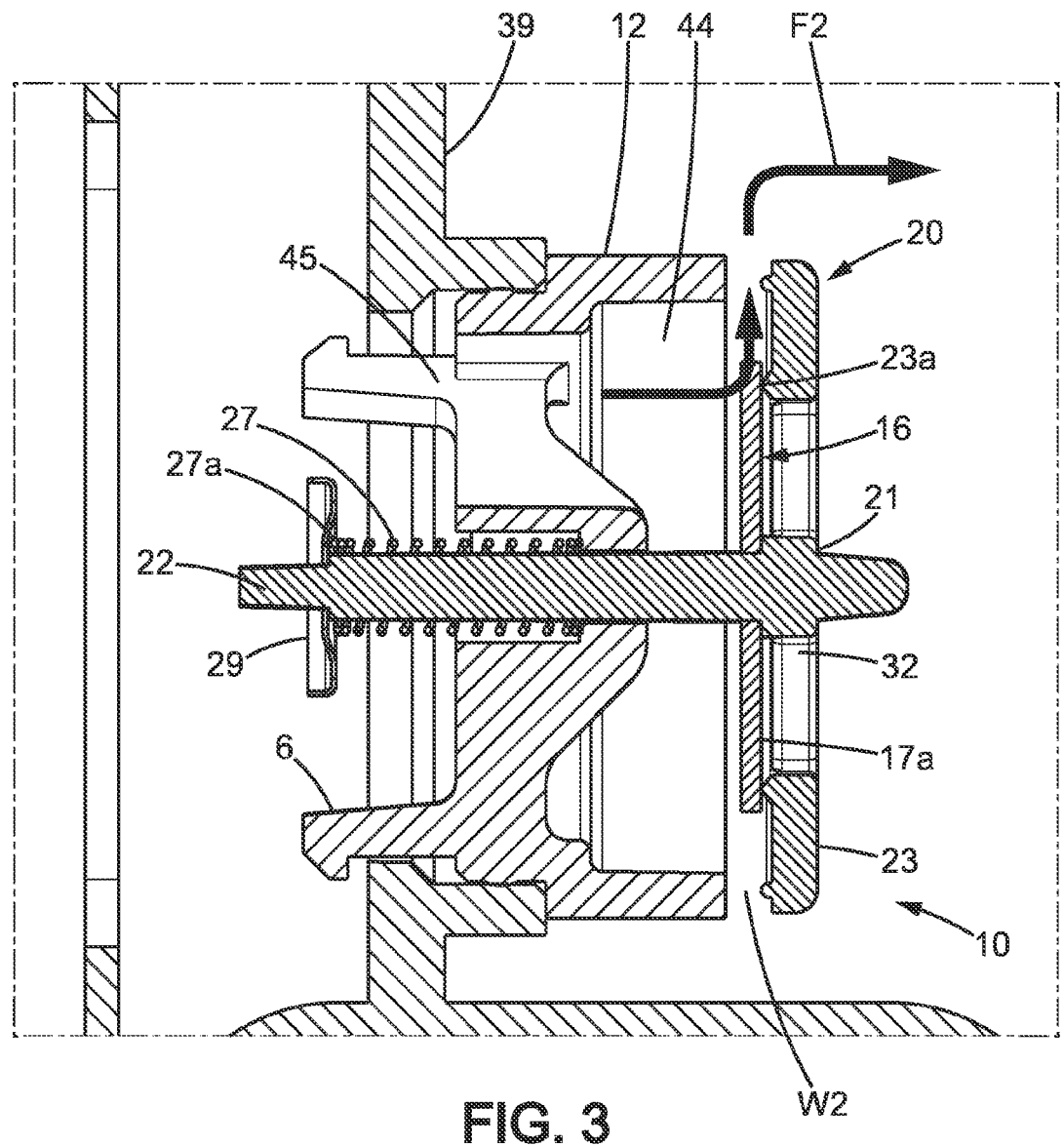

Referring now to FIGS. 2A-2B and 3, one can see that the dual valve assembly effectively combines the check and bypass valve functions. The check mode of operation is the normal mode of operation, where the stream of laden gases G from the crankcase (in the upstream area Z1 to the right in the figures) pushes the check valve 16 forward, as shown in FIG. 2A. As long as such positive pressure exists, a first passage W1 is cleared by the advance of the valve 16 and the flow is in a first flow direction of the laden gases G (see arrows F1 in FIG. 2A, allowing the gases to reach area Z2 downstream from the pipe segment 12).

In practice, for the non-limiting case of a gasoline turbocharged engine, such a configuration of the dual valve assembly allows a substantial portion of the laden gases to flow to the turbocharger (see FIG. 2A), typically after separation by a purification system.

When the pipe segment 12 is closed as illustrated in FIG. 1 or FIG. 2B, the laden gases cannot be directed toward the downstream area Z2 but can be directed toward an intake manifold, via the upper pipe CS.

Due to its mobility, here along the rod 22, the check valve 16 prevents the gases from returning toward the inlet pipes E. Thus, when the forward thrust of the flow of laden gases G ceases due to negative pressure upstream of the arrangement 10, the closing member 17 comes to rest on the seat 23a defined by the peripheral portion 23 of the bypass valve 20. In effect, the thrust on the closing member 17 is reversed and we obtain the configuration where the first passage is closed, as is clearly visible in FIG. 2B. In normal operation, the pressure is positive overall and the closed configuration is obtained very briefly.

In the example of FIGS. 1 to 4, normal operation (without movement of the bypass valve 20) occurs as long as the absolute value of the negative pressure does not exceed a threshold, which is for example between 30 and 50 mbar.

When operating in bypass mode, the control arrangement 10 keeps the check valve 16 against the seat 23a and it is a second passage W2 that is cleared by the retreat of the bypass valve 20 under the effect of negative pressure. This displacement of the radial portion of the valve 20 occurs against the restoring force of the elastic biasing member 27, here a spring. It is understood that it is optionally the spring stiffness and the dimensions of the surface area exposed to the thrust of the gases that set the threshold for opening the second passage W2. The laden gases are thus returned (arrow F2, second flow direction) and may optionally be routed through an upper pipe CS.

The closing member 17 of the check valve 16, preferably having no opening, has a predefined face 17a in annular contact with the seat 23a in the closed configuration of the first passage W1. This closes the orifices 32 defined in the central portion 21, as is clearly visible in FIGS. 2B and 3 (see also FIG. 5A). The predefined face 17a is thus oriented in a direction which is in opposition to the restoring force exerted by the elastic biasing member 27.

The movement of the spring or other similar elastic biasing part is guided by an intermediate support portion of the guide rod 22, distanced from the contact area 22C with the check valve 16. This intermediate portion slides in the fixed guide 25, here of tubular shape. As the fixed guide 25 includes the stop surface 30 in contact with end 27b, the latter cannot follow the movement of the rod 22, unlike end 22a.

As illustrated in the figures, the elastic biasing member 27 may be a simple coil spring mounted so as to be energized by compression when the second passage W2 is clear. This compressed state, caused by the retreat of the retaining member 29 which follows the movement of the bypass valve 20, is clearly visible in FIG. 3.

As is clearly visible in FIG. 4 in particular, the pipe segment 12 may be made as a single plastic part and have an anchoring end 12b opposite end 12a. This pipe segment 12 defines a mounting bracket for the bypass valve 20 which in turn supports the check valve 16 via a rod 22.

Here, a single rod 22 is provided. Alternatively, a plurality of elongate elements may optionally serve to support the check valve 16, using multiple sliding shafts supported by fixed guides arranged internally in the pipe segment 12.

Referring to FIG. 3, the movement of the valves 16 and 20 may typically result from an absence or near absence of pressure at the inlet 11 side (no engine load). This is for example the case in a "coasting mode" phase. Part of the flow of clean air normally directed towards the turbocharger (or to a comparable area) from the downstream area Z2 where purification takes place, is directed towards the manifold via the second passage W2 and via an upper pipe CS as can be seen in FIG. 1.

In the non-limiting example shown in FIGS. 1 to 4, one can see that the pipe segment 12 is not completely hollow. The axial sleeve 120 here is centrally housed within the internal volume defined by the annular outer portion 36 and radially connected thereto by struts 37. The axial sleeve 120 is thus rendered rigidly integral with the outer portion 36 by these struts 37 which extend like spokes around the central tube 38. The axial sleeve 120 has an end 40 that is proximal relative to the check valve 16. This end 40 defines for example an annular abutment facing the check valve 16.

To enable fixedly mounting the pipe segment 12 in a duct 39, the annular outer portion 36 may have one or more axial extensions 12b that define the anchoring end 12b. The pipe segment 12 can thus be snap-fitted or force-fitted without tools, into a tubular location defined by a skirt (here a circular skirt) of the duct 39. In this non-limiting example, the duct 39 is bounded at the top by a cylinder head cover CC of the internal combustion engine.

After mounting the pipe segment 12, the position of the longitudinal axis X is well-defined and the segment 12 is firmly retained by anchoring tabs 6 which extend axially towards the front of the outer portion 36 or are connected to it. In this example, at least one of the tabs 6 may comprise a stop lug 7 which prevents rearward removal of the assembly 10. One will note that the check valve 16 and the radial part of the bypass valve are not elements inserted through the mounting area, which reduces the risk of damage during assembly.

The tabs 6, which are fixed, are arranged around the rod 22 and do not interfere with the sliding movement of the bypass valve 20.

Referring to FIG. 4, the outer portion 36 comprises an outer peripheral face 360 adapted to be fixed by fluidtight radial contact in a rigid pipe or duct 39 of the circuit for laden gases. Between the outer portion 36 and the axial sleeve 120, the laden gases G can flow through one or more openings 45.

One or more longitudinal passages comprising this or these openings 45 are in communication with the inlet in an open configuration of the first passage W1 and second passage W2, respectively. A common chamber 44 for the flow of laden gases is provided here which is adjacent to the first passage W1 and the second passage W2. The sliding movement of the check valve 16 can occur within this common chamber 44, between the end 40 and an external shoulder or stop surface formed at the connection of the rod 22 and the central portion 21.

Figure 6A:
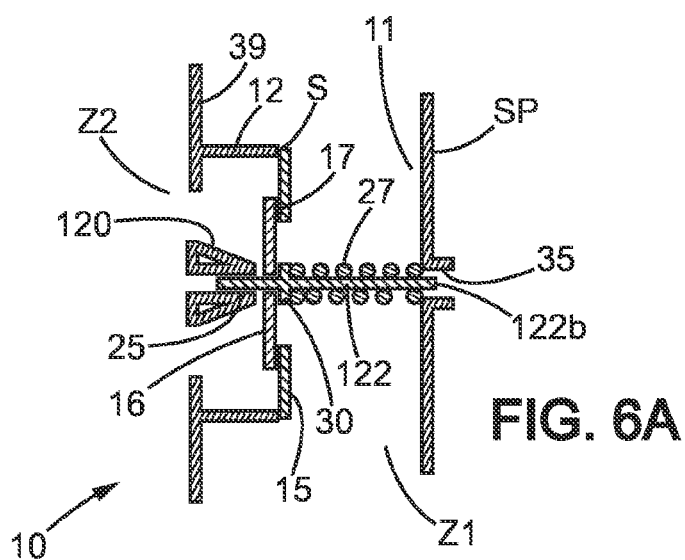
FIGS. 6A, 6B and 6C illustrate an arrangement according to a third embodiment of the invention, these figures respectively showing the closed state of the two valves, the opening of a first passage (check mode) by movement of the check valve under the effect of positive pressure, and the opening of a second passage (bypass mode) by displacement of the movable assembly formed by the two valves under the effect of negative pressure.
Figure 6B:
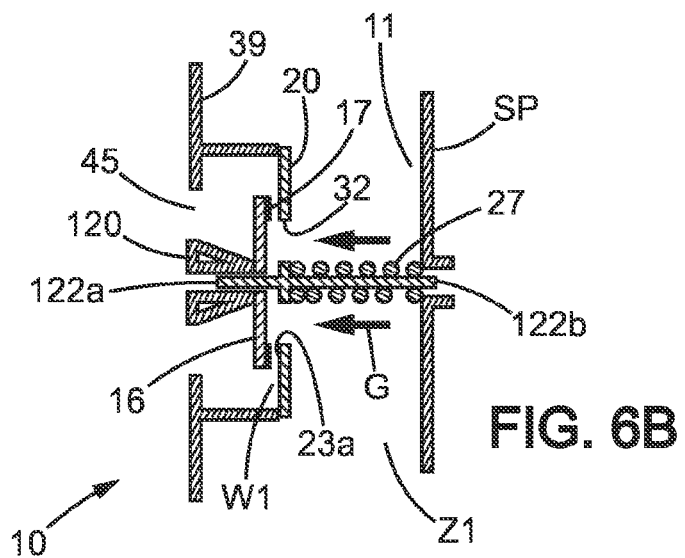

In FIG. 2A and FIG. 6B, one can see that the chamber 44 of the longitudinal passage has an axial rear opening when the first passage W1 is open; in this case, at least the closing member 17 of the valve 16 extends across this longitudinal passage (within the chamber 44), having a redirection effect which does not prevent the flow of laden gases G in a generally longitudinal direction.

Figure 6C:
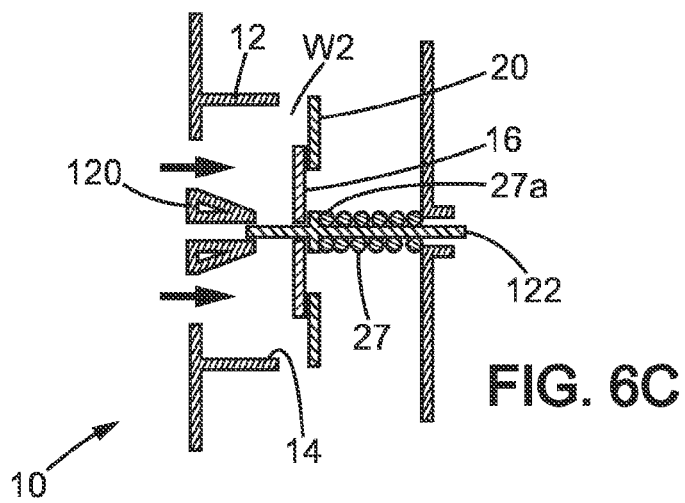

In FIG. 2B and FIG. 6C, the chamber 44 of the longitudinal passage has a radial opening to the exterior when the second passage W2 is open. In a case of negative pressure with the second flow direction, the two valves 16 and 20 thus work together to redirect and guide the flow to a region which is typically separate from the inlet 11.

As illustrated in FIGS. 1 to 2B in particular, the coil spring which forms the elastic biasing member 27 can be partly accommodated through the central tube 38. To form the fixed guide 25, the central tube 38 has a narrowed section formed from the end 40 and joining the wider tube portion which accommodates the spring at the fixed end side.

In this first embodiment, the peripheral portion 23 may be substantially planar, which thus reduces the mass (less plastic is used) of the bypass valve 20.

Figure 5A:
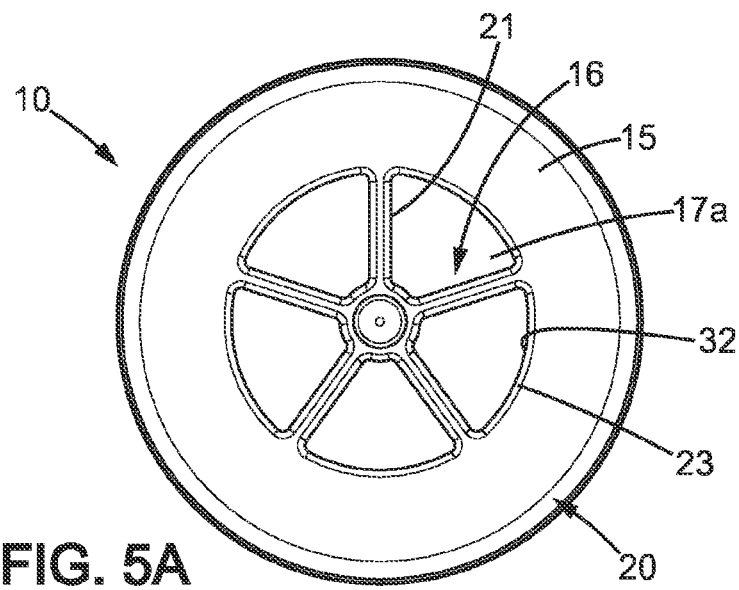
Figure 5B:
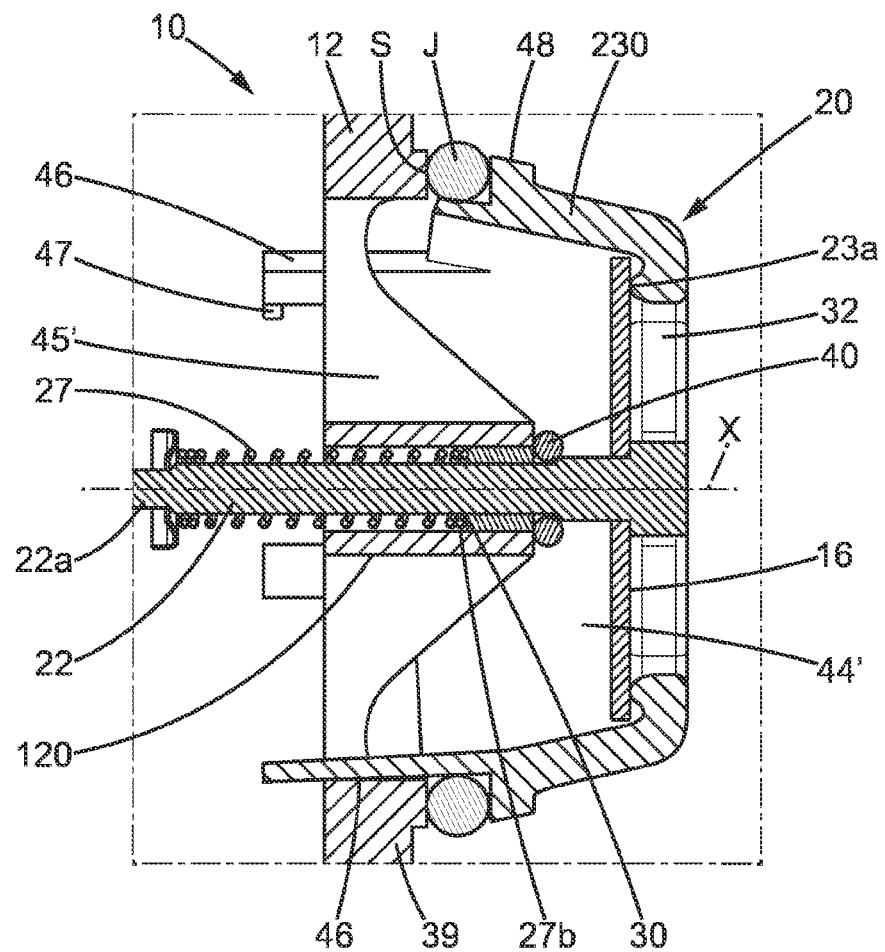

Referring now to FIGS. 5A and 5B, it can be seen that the peripheral portion 23 is not necessarily flat and may include a skirt 230 of annular cross-section. In this case, it is understood that the second passage W2 is offset axially forward relative to the first passage W1, unlike the first embodiment. The common chamber 44' here is only surrounded by the skirt 230 and is in communication with the openings 45' distributed around the axial sleeve 120. In this second embodiment, the arrangement 10 has an area of direct contact between the bypass valve 20 and a tubular wall of the duct 39, preferably located frontward relative to the portions which close the respective passages W1 and W2.

The perforated central portion 21 remains unchanged, and the operation of the check valve 16 is the same. The elastic biasing member 27 thus also extends from the side opposite to the outer face 15. The positive pressure enables moving the check valve 16 only (the bypass valve 20 remaining in its closed position) and the outer face 15 thus forms an inlet face for the laden gases G flowing through the first passage W1.

An additional seal is optionally used at end 40. An O-ring seal J may be provided at the end of the skirt 230 to establish the sealing contact against the stationary seating surface S. An annular bead 48 or similar external shape may be formed on the skirt 230 for axially maintaining the position of the O-ring J.

As can clearly be seen in FIG. 5B, the pipe segment 12 may optionally be an integral part of the duct 39. The mounting operation then occurs by means of anchoring tabs 46 which are part of the bypass valve 20 or are connected to it.

In this second embodiment, at least one of the tabs 46 may comprise a stop lug 47 arranged to define an end position of the backward travel of the bypass valve 20. The tab or tabs 46 here form axial extensions of the skirt 230 and each have a guide surface, directed radially outward and in contact with a tubular wall of the duct 39. However, other anchoring members may of course be used additionally or alternatively, while leaving a degree of sliding freedom for the bypass valve 20.

Although the elastic biasing member 27 is here in engagement with the bypass valve 20 (by the axial contact against the retaining member 29), without touching the valve 16 or interfering with the movement of the valve 16, in alternative embodiments the elastic biasing member engages directly with the check valve 16. This can be the case particularly when the check valve 16 is in the form of a membrane having a static portion which remains fixed relative to the bypass valve 20. The restoring force can then be exerted on this static portion without preventing the unblocking of the first passage W1.

Referring now to FIGS. 6A, 6B and 6C, one can see that the elastic biasing member 27 may be placed on the inlet 11 side, while exerting a frontward restoring force on the bypass valve 20 in order to default to closing the second passage W2. An additional fixed guide 35 may be provided for guiding one end 122b of the rod 122, while the other end slides 122A through the fixed guide 25 defined by the axial sleeve 120. Although the figures show a fixed guide 25 formed internally in the pipe segment 12, it is understood that it may also be placed further forward in the downstream area Z2.

The arrangement 10 may have a stationary stop surface 30 formed by the fixed guide 25. The stop surface 30 here is oriented in the opposite direction in comparison to the embodiments described above, being placed rearward relative to the position of the closing member 17 of the check valve 16. The elastic biasing member 27 therefore extends substantially from the inlet face side (outer face 15) of the arrangement 10.

Under the effect of positive pressure, the flow of laden gases G selectively pushes the check valve 16 into a position away from the seat 23a, as illustrated in FIG. 6B. Here, when a spring forms the elastic biasing member 27, it exerts a restoring force which is oriented in the same direction as the thrust of the laden gases in the normal flow mode.

The bypass valve 20, situated rearward of the pipe segment 12, therefore remains in contact with the stationary seating surface S and the arrangement 10 operates in check mode (normal flow mode). The escape path formed by the second passage W2 remains closed in this mode.

As is clearly visible in FIG. 6C, a compressed state of the spring is obtained only in bypass mode. In this configuration of the spring (or other equivalent elastic biasing member, and more generally any means enabling direct or indirect thrust or repulsion from a distance, in a specific direction). The negative pressure is then sufficient to push back the bypass valve 20 and the second passage W2 is cleared.

As in the first and second embodiments, the check valve 16 can be displaced at a pressure below the threshold pressure necessary to compress the spring or an equivalent threshold for energizing the elastic biasing member 27. As a result, the first passage W1 which opens axially towards the inlet 11 can be systematically closed when the second passage W2 is cleared to form an escape path in a radial direction.

One advantage of the invention is a gain in compactness (which can greatly facilitate installation of the arrangement) while obtaining a very satisfactory response of the valves to the pressures on either side of the pipe segment.

The arrangement 10 for controlling the flow of crankcase gases is particularly suitable for equipping closed crankcase ventilation (CCV) solutions, which are demanding in terms of efficiency (see the EURO 6 standard and the continuing trend towards more demanding European emission standards) in compact vehicles.

It should be obvious to those skilled in the art that the present invention allows embodiments in many other specific forms without departing from the scope of the invention as claimed. For example, the context is not limited to an engine of a motor vehicle, and the position of the arrangement 10 and its overall dimensions can change to suit requirements. Furthermore, although the figures show a coaxial configuration of the closing members of the valves 16 and 20, with a circular shape around one rod 22 which supports the biasing member 27, alternative arrangements can have different shapes for the closing members and/or a different position of the biasing member 27 (peripheral, for example around the pipe segment 12) and/or a non-homogeneous distribution of the orifices 32 of the central portion 21 around the longitudinal axis X. Also, the structure forming the fixed guide 25 may optionally be formed separately from the pipe segment 12.

The invention claimed is:

1. An arrangement for controlling a flow of laden gases issuing from a crankcase of an internal combustion engine, configured to be placed between an upstream inlet area supplying the laden gases and a downstream area in communication with an air intake recirculation system, the arrangement comprising:
   a check valve having a closing member movable by positive pressure to define a first passage for a first flow direction;

a bypass valve set in motion by negative pressure and enabling the defining of a second passage for a second flow direction that is opposite the first flow direction;

a pipe segment having a stationary seating surface configured to define, with the bypass valve, the second passage; and an elastic biasing member engaged with one of the check valve and the bypass valve, the elastic biasing member extending around a rod, wherein the check valve and the bypass valve are each slidable and guided by the rod, without another elastic biasing member being provided around the rod, and wherein the bypass valve defines a seat on which the closing member of the check valve comes to rest in a closed configuration of the first passage, the elastic biasing member exerting a restoring force directed in a first, forward, direction that urges the bypass valve towards a position which closes the second passage, the closing member of the check valve and the bypass valve being configured to retreat in a second, rearward, direction that is opposite to the first direction, under the effect of negative pressure.

2. The arrangement according to claim 1, wherein the elastic biasing member extends between a first end and a second end which are aligned along an axis of movement common to the check valve and bypass valve, the first end being slidingly integral with the bypass valve.

3. The arrangement according to claim 1, wherein the closing member has a predefined face in annular contact with the seat in the closed configuration of the first passage, the predefined face being oriented in the second direction, in opposition to the restoring force, wherein an annular peripheral portion of the bypass valve is configured to contact the closing member of the check valve, by a continuous front annular surface, and contact the stationary seating surface, and wherein the annular peripheral portion of the bypass valve is situated rearward of the pipe segment and rearward of the check valve.

4. The arrangement according to claim 1, wherein the bypass valve defines at least one passage orifice facing the closing member, the check valve being forwardly unbiased or less biased by the elastic biasing member than the bypass valve, such that the bypass valve moves rearward to clear the second passage only in a closed configuration of the first passage in which the closing member seals the passage orifice.

5. The arrangement according to claim 1, wherein the bypass valve and the rod are part of a single piece.

6. The arrangement according to claim 5, wherein the rod has an intermediate portion that slides in a predefined fixed guide, the predefined fixed guide being provided with a stop surface that defines the position of a fixed end of the elastic biasing member.

7. The arrangement according to claim 5, further comprising a predefined fixed guide for the sliding of a first end of the rod and an additional fixed guide to guide a second end of the rod.

8. The arrangement according to claim 6, wherein the pipe segment, formed as a single plastic part, defines a mounting bracket for the bypass valve and comprises:

an axial sleeve that defines the predefined fixed guide and has an abutment end for abutment contact with the check valve, an annular outer portion integral with the axial sleeve, comprising an outer peripheral face configured for attachment by fluidtight radial contact in a rigid pipe of the circuit for laden gases, the annular outer portion defining, by an axial end, said stationary seating surface, at least one passage opening being bounded by the axial end, and at least one longitudinal passage defined between the axial sleeve and the annular outer portion, and open at the passage opening side in an open configuration of the first passage and second passage, respectively;

the check valve being mounted on the rod to slide between the abutment end of the axial sleeve and a perforated portion of the bypass valve.

9. The arrangement according to claim 5, wherein the bypass valve comprises:

a perforated portion centrally connected to the rod, and a skirt that externally supports an O-ring seal configured to come to bear against the stationary seating surface.

10. The arrangement according to claim 9, wherein the bypass valve comprises guide tabs, each extending in the first direction from an annular area in contact with said O-ring, and each configured to fit against an inner annular face of the pipe segment and define an end position of the backward travel of the bypass valve.

11. The arrangement according to claim 1, wherein the elastic biasing member is a spring, mounted to be energized by compression when the second passage is clear.

12. The arrangement according to claim 11, wherein the bypass valve has a perforated portion that defines an inlet face for the laden gases flowing through the first passage, the spring extending from a side opposite the inlet face to extend inside the pipe segment, the spring having a spring end adjacent to a free end of the rod.

13. The arrangement according to claim 11, wherein the bypass valve has a perforated portion that defines an inlet face for the laden gases flowing through the first passage, the spring extending from an inlet face side to extend outside the pipe segment.

14. The arrangement according to claim 1, wherein the pipe segment is integral with a duct bounded at the top by a cylinder head cover of an internal combustion engine.

15. A method for controlling a flow of laden gases issuing from a crankcase of an internal combustion engine, implemented by using the arrangement as defined in claim 1, the bypass valve of the arrangement being set in motion by negative pressure, an annular peripheral portion of the bypass valve, which is used to contact the stationary seating surface, extending outside the pipe segment, the method comprising:

routing a flow of laden gases between an inlet and an air intake recirculation system of the engine, passing through the pipe segment of the arrangement, allowing the flow of laden gases to travel in a first flow direction through the pipe segment, during normal operation with positive pressure, via the first passage defined between the check valve of the arrangement which is in a forward position and the bypass valve held in contact position against the stationary seating surface formed by the segment, and closing the first passage by moving the check valve rearward until the check valve comes into contact with the bypass valve, when the pressure becomes negative, and allowing the bypass valve to move away from the stationary seating surface when a negative pressure threshold is reached in order to clear the second passage between the bypass valve and the stationary seating surface and thereby obtain a second flow direction through the segment, opposite to the first flow direction.

16. The arrangement according to claim 2, wherein the elastic biasing member is a coil spring mounted to be energized by compression when the second passage is clear, the pipe segment extending around the elastic biasing member.

17. The arrangement according to claim 5, wherein the bypass valve comprises a perforated portion centrally connected to the rod, and
    wherein the rod, which is included in the bypass valve, comprises a free end disposed opposite the perforated portion, the check valve being mounted on the rod by sliding around the rod from the free end toward the perforated portion.

18. The method according to claim 15, wherein the negative pressure threshold is between 30 and 50 mbar.

19. An arrangement for controlling a flow of laden gases issuing from a crankcase of an internal combustion engine, configured to be placed between an upstream inlet area supplying the laden gases and a downstream area in communication with an air intake recirculation system, the arrangement comprising:
    a check valve having a closing member movable by positive pressure so as to define a first passage for a first flow direction;
    a bypass valve set in motion by negative pressure and enabling the defining of a second passage for a second flow direction that is opposite the first flow direction;
    a pipe segment having a stationary seating surface configured to define, with the bypass valve, the second passage, the stationary seating surface being an annular end surface of the pipe segment orientated toward outside the pipe segment; and
    an elastic biasing member engaged with one of the check valve and the bypass valve,
    wherein the bypass valve defines a seat on which the closing member of the check valve comes to rest in a closed configuration of the first passage, the elastic biasing member exerting a restoring force directed in a first, forward, direction that urges the bypass valve towards a contact position which closes the second passage,
    wherein an annular peripheral portion of the bypass valve, which is provided to contact the stationary seating surface, extends outside the pipe segment in the contact position, and
    wherein, in order to ensure opening of the second passage, the closing member of the check valve and the bypass valve are configured to retreat in a second, rearward, direction is opposite to the first direction, under the effect of negative pressure.

20. The arrangement according to claim 19, wherein, when the second passage is open, the elastic biasing member is of a longer size than when the second passage is closed, the elastic biasing member being a coil spring.

21. The arrangement according to claim 1, wherein the bypass valve defines at least one passage orifice facing the closing member, the check valve being slidable and guided by the rod without any biasing contact with the elastic biasing member.

* * * * *